(12) United States Patent
Pearlman et al.

(10) Patent No.: US 10,289,650 B2
(45) Date of Patent: May 14, 2019

(54) ACTIVE STABILITY DEVICES AND SYSTEMS FOR MOBILE DEVICES

(71) Applicants: University of Pittsburgh—Of the Commonwealth System of Higher Education, Pittsburgh, PA (US); The United States of America as represented by the Department of Veterans Affairs, Washington, DC (US)

(72) Inventors: Jonathan L. Pearlman, Pittsburgh, PA (US); Jonathan Aaron Duvall, Pittsburgh, PA (US); Benjamin Todd Gebrosky, Gibsonia, PA (US); Rory Alan Cooper, Gibsonia, PA (US)

(73) Assignees: University of Pittsburgh—Of the Commonwealth System of Higher Education, Pittsburg, PA (US); The United States of America as represented by the Department of Veterans Affairs, Washington, DC (US)

( * ) Notice: Subject to any disclaimer, the term of this patent is extended or adjusted under 35 U.S.C. 154(b) by 0 days.

(21) Appl. No.: 15/273,116

(22) Filed: Sep. 22, 2016

(65) Prior Publication Data
US 2018/0011815 A1    Jan. 11, 2018

Related U.S. Application Data

(63) Continuation of application No. 13/750,619, filed on Jan. 25, 2013, now abandoned.
(Continued)

(51) Int. Cl.
*G06F 17/00*    (2006.01)
*A61G 5/00*    (2006.01)
(Continued)

(52) U.S. Cl.
CPC ............... *G06F 17/00* (2013.01); *A61G 5/00* (2013.01); *A61G 5/043* (2013.01); *A61G 5/1054* (2016.11);
(Continued)

(58) Field of Classification Search
CPC .............................. G06F 17/00; A61G 5/1089
See application file for complete search history.

(56) References Cited

U.S. PATENT DOCUMENTS 5,137,295 A * 8/1992 Peek ........................ A61G 5/10
                                                    280/250.1
5,181,733 A * 1/1993 Tague ...................... A61G 5/10
                                                    280/304
(Continued)

OTHER PUBLICATIONS

Pearlman, J., et al., Design, development and testing of a low-cost electric powered wheelchair for India, Disability and Rehabilitation, Assistive Technology, 4(1):, 42-57 (2009).

*Primary Examiner* — Jess Whittington
(74) *Attorney, Agent, or Firm* — Bartony & Associates, LLC

(57) ABSTRACT

A system for use with a mobile device includes at least one sensor to sense a variable related to tilting of the mobile device and at least one activatable system in operative connection with the sensor. The at least one activatable system increases stability of the mobile device upon actuation/change in state thereof on the basis of data measured by the at least one sensor. A variable related to tilting includes variables that indicate concurrent, actual tilting as described herein as well as variables predictive of imminent tilting. Activatable systems hereof change state upon actuation or activation to increase stability of the mobile device by reducing, eliminating or preventing tilting.

20 Claims, 9 Drawing Sheets

Related U.S. Application Data

(60) Provisional application No. 61/591,238, filed on Jan. 26, 2012.

(51) Int. Cl.
    *A61G 5/04*   (2013.01)
    *A61G 5/10*   (2006.01)
    *A61G 5/12*   (2006.01)
    *A61G 5/06*   (2006.01)

(52) U.S. Cl.
    CPC ............ *A61G 5/1089* (2016.11); *A61G 5/128* (2016.11); *A61G 5/063* (2013.01); *A61G 5/068* (2013.01); *A61G 2203/14* (2013.01); *A61G 2203/42* (2013.01)

(56) References Cited

U.S. PATENT DOCUMENTS

| | | | |
|---|---|---|---|
| 5,251,136 A | 10/1993 | Fukuyama | |
| 5,853,059 A | 12/1998 | Goertzen | |
| 6,129,165 A * | 10/2000 | Schaffner | A61G 5/042 180/65.1 |
| 6,601,863 B1 | 8/2003 | Mentessi | |
| 6,681,905 B2 | 1/2004 | Edmondson | |
| 6,721,641 B1 | 4/2004 | Denne | |
| 6,722,676 B2 | 4/2004 | Zadok | |
| 6,923,278 B2 | 8/2005 | Mulhern | |
| 7,055,634 B2 | 6/2006 | Molnar | |
| 7,226,056 B2 | 6/2007 | Barron | |
| 7,264,272 B2 * | 9/2007 | Mulhern | A61G 5/043 180/65.1 |
| 7,316,282 B2 * | 1/2008 | Mulhern | A61G 5/043 180/65.1 |
| 7,882,909 B2 * | 2/2011 | Pearlman | A61G 5/043 180/23 |
| 8,534,679 B2 | 9/2013 | Goertzen | |
| 2004/0262859 A1 * | 12/2004 | Turturiello | A61G 5/042 280/5.515 |
| 2005/0151360 A1 * | 7/2005 | Bertrand | A61G 5/043 280/755 |
| 2006/0244249 A1 * | 11/2006 | Goertzen | A61G 5/043 280/755 |
| 2007/0012526 A1 * | 1/2007 | Holub | A61G 5/10 188/2 F |
| 2007/0023244 A1 * | 2/2007 | Carlson | A47C 1/03 188/267 |
| 2007/0145711 A1 * | 6/2007 | Mulhern | A61G 5/043 280/304.1 |
| 2007/0290492 A1 * | 12/2007 | Kramer | B62H 1/12 280/755 |
| 2009/0045021 A1 * | 2/2009 | Einbinder | A61H 3/04 188/2 D |
| 2009/0079159 A1 * | 3/2009 | Every | A61G 5/08 280/250.1 |
| 2010/0170730 A1 * | 7/2010 | Schaffner | A61G 5/042 180/65.1 |
| 2012/0056404 A1 * | 3/2012 | Rousseau | A61G 5/10 280/304.1 |
| 2013/0207364 A1 * | 8/2013 | Bekoscke | A61G 5/045 280/124.104 |

* cited by examiner

ACTIVE STABILITY DEVICES AND SYSTEMS FOR MOBILE DEVICES

CROSS-REFERENCE TO RELATED APPLICATIONS

This application is a continuation application of U.S. patent application Ser. No. 13/750,619, filed Jan. 25, 2013, which claims benefit of U.S. Provisional Patent Application Ser. No. 61/591,238, filed Jan. 26, 2012, the disclosures of which are incorporated herein by reference.

GOVERNMENTAL INTEREST

This invention was made with government support under the National Science Foundation Grant No. EEC 0552351, NIH Grant No. HD058376 and VA Center of Excellence Grant No. B6789C. The government has certain rights in this invention.

BACKGROUND

The following information is provided to assist the reader in understanding technologies disclosed below and the environment in which such technologies may typically be used. The terms used herein are not intended to be limited to any particular narrow interpretation unless clearly stated otherwise in this document. References set forth herein may facilitate understanding of the technologies or the background thereof. The disclosure of all references cited herein are incorporated by reference.

Personal Mobility Devices (PMDs) such as electronic power wheelchairs (EPW) as illustrated in FIG. 1A, scooters as illustrated in FIG. 1B and manual wheelchairs as illustrated in FIG. 1C are very beneficial to the people with mobility impairments. As used herein, the term "personal mobility device" or PMD refers to mobile devices to transport a person, thereby increasing the mobility of the person. However, those benefits come with some risks. One such risk lies in the stability of the PMD. A review of the US Food and Drug Administration's (FDA's) Manufacturer and User Facility Device Experience (MAUDE) database shows that one of the most frequent adverse events connected to these devices is their inclination to tip; causing the user to be thrown from the device and injured, sometimes severely. In a study done between 1975 and 1993, 25.7% of the wheelchair safety incidents reported to the FDA were from a tip and/or fall. R. Lee Kirby, S. A.-S. Wheelchair Safety-Adverse Reports to the Food and Drug Administration, *American Journal of Physical Medicine and Rehabilitation,* 308-312 (1995).

To help prevent these injuries the US Department of Veterans Affairs (VA), the FDA and the Centers for Medicare & Medicaid Services (CMS) require that PMDs are tested for stability issues and that the results then be published in the user manual. Testing the PMDs and reporting the results do not necessarily mean that they are stable. However, the VA has become more proactive about requiring that PMDs be more stable. They have indicated in their requests for low cost EPW's that they are dynamically stable on a 6° slope.

It is a good idea to change the design of the PMDs to make them more stable; however any design change may affect the performance of the device as well. Slowing the speed of the device reduces mobility and independence. Making a wider frame can limit access to narrow places. Stiff suspension reduces user comfort. Passive anti-tip devices limit some safe maneuvers and can be ineffective if not properly adjusted to the user's specifications.

SUMMARY

In one aspect, a system for use with a mobile device includes at least one sensor to sense a variable related to tilting of the mobile device and at least one activatable system in operative connection with the sensor. The at least one activatable system increases stability of the mobile device upon actuation/change in state thereof on the basis of data measured by the at least one sensor. A variable related to tilting includes variables that indicate concurrent, actual tilting as described herein as well as variables predictive of imminent tilting. Activatable systems hereof change state upon actuation or activation to increase stability of the mobile device by reducing, eliminating or preventing tilting. The system may further include a control system in operative connection with the at least one sensor and in cooperative connection with the at least one activatable system to control whether the at least one activatable system is activated on the basis of data measure by the at least one sensor.

The at least one activatable system may, for example, include at least one activatable damper system or at least one activatable brake system. In a number of embodiments, the at least one activatable system is in operative connection with a suspension system of the mobile device. In a number of embodiments, the at least one activatable system is in operative connection with at least one abutment member adapted to contact a surface upon which the mobile device is supported to increase or enhance stability or prevent instability.

In a number of embodiments, the mobile device is a personal mobility device. The personal mobility device may, for example, be an electrically powered wheelchair or an electrically powered scooter.

Activatable systems in operative connection with at least one abutment member adapted to contact a surface upon which the mobile device is supported to increase or enhance stability or prevent instability may, for example, be used in connection with manually powered wheelchair or powered wheelchairs. In a number of embodiments, the abutment member includes a wheel that moves up and down before activation of the activatable system, but requires more force to move upon or down or is prevented from moving up or down upon activation of the activatable system. The wheel may, for example be biased to remain in contact with a surface upon which the mobile is traveling when the activatable system in not activated.

In a number of embodiments, the mobile devices (or suspension systems thereof in some embodiment) may operate independently of the activatable systems. The activatable systems hereof need not be formed integrally with systems upon manufacture thereof and are, for example, readily adapted to be attached to an existing mobile device.

In another aspect, a method of operating a mobile device includes providing at least one sensor to sense a variable related to tilting of the mobile device in operative connection with the mobile device, providing at least one activatable system in operative connection with the sensor, and activating the at least one activatable system to increase stability of the mobile device on the basis of data measured by the at least one sensor. The method may further include providing a control system in operative connection with the at least one sensor and in cooperative connection with the at least one activatable system to control whether the at least one activatable system is activated on the basis of data measured by the at least one sensor. As described above, the at least one activatable system may, for example, include at least one activatable damper system or at least one activatable brake system.

In another aspect, a mobile system includes an anti-tip system including at least one sensor to sense a variable related to tilting of the mobile system, and at least one activatable system in operative connection with the sensor. The at least one activatable system increases stability of the mobile system on the basis of data measured by the at least one sensor.

The present devices, systems, and methods, along with the attributes and attendant advantages thereof, will best be appreciated and understood in view of the following detailed description taken in conjunction with the accompanying drawings.

DETAILED DESCRIPTION

Figure 1B:
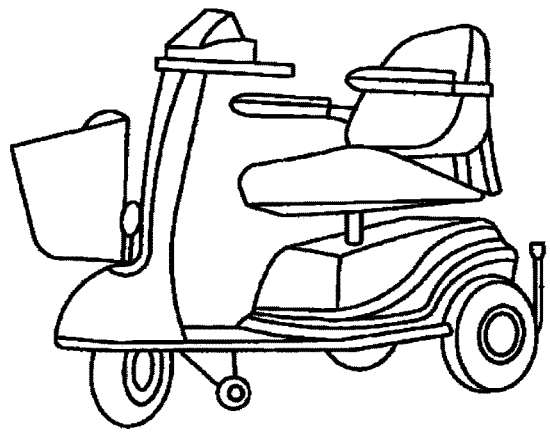
FIG. 1B illustrates a typical embodiment of an electrically powered wheelchair.
Figure 1A:
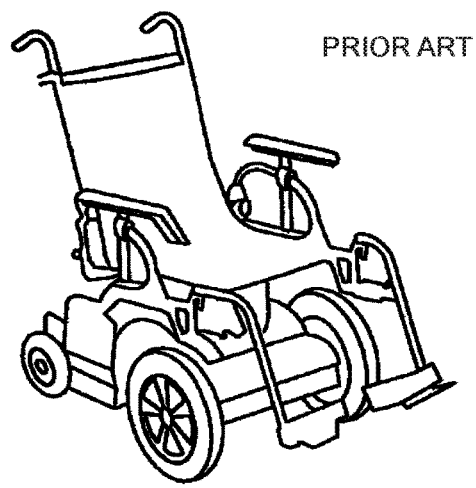
FIG. 1A illustrates a typical embodiment of a scooter.
Figure 1C:
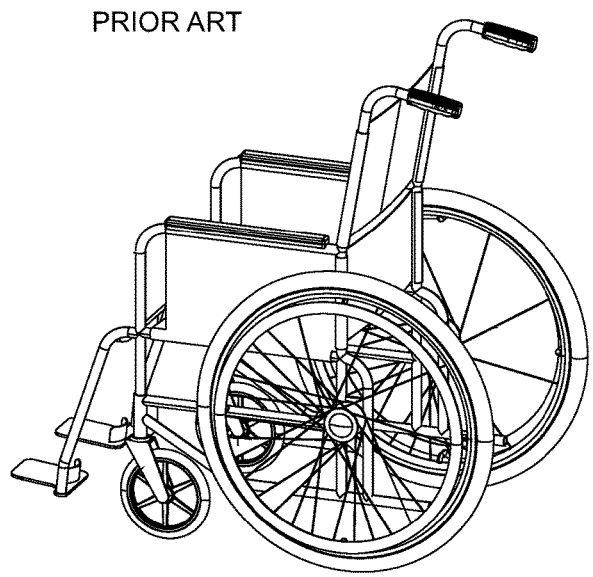
FIG. 1C illustrates a typical embodiment of a manually powered wheelchair.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

As used herein and in the appended claims, the singular forms "a," "an", and "the" include plural references unless the context clearly dictates otherwise. Thus, for example, reference to "a sensor" includes a plurality of such sensors and equivalents thereof known to those skilled in the art, and so forth, and reference to "the sensor" is a reference to one or more such sensors and equivalents thereof known to those skilled in the art, and so forth.

In a number of represented embodiment hereof, active stability devices (ASD) hereof are discussed for use in connection with personal mobility devices for personal transportation. Such personal mobility devices may be used to transport a human user either through manual control or autonomously. However, the active stability devices hereof are suitable for use in connection with many mobile devices, including personal mobility devices such wheelchairs (both electric-motor powered and manual) and scooters, as well as mobile robotic bases and others mobile devices.

In a number of embodiments hereof, active stability devices or systems for use with mobile devices are provided that do not interfere with normal operation of the mobile device, but activate only when a mobile device such as a wheelchair is in an unstable situation or is about to become unstable. Devices, systems and methods hereof may, for example, be used to increase the stability of mobile devices including personal mobility devices such as wheelchairs. In a number of embodiments, systems hereof include at least one sensor and at least one actuator. Under conditions where instability exists or is predicted, the actuator activates in a manner to increase stability (or reduce or prevent instability) of the system. In general, the term "instability" as used herein refers to tilting or tipping of a mobile device. Tilting or tipping occurs upon rotation about an axis (for example, a longitudinal axes or a latitudinal axes) of the mobile device causes at least one wheel (or other rotatable mobility elements) of the mobile device to loose contact with a surface or plane upon which the mobile device is moving.

For example, in a number of personal mobility devices, a soft suspension on the device is used to increase ride comfort, but can also make the device unstable under certain dynamic situations. To preserve comfort and increase stability of such wheeled personal mobility devices, a representative embodiment of an active suspension system was developed and tested on the prototype hybrid power operated vehicle (HyPOV) chair. See, for example, U.S. Pat. No. 7,882,909 and Pearlman, J., et al., "Design, development and testing of a low-cost electric powered wheelchair for India. Disability and Rehabilitation," *Assistive Technology*, 4(1): 42-57 (2009), the disclosures of which is incorporated herein by reference. In a number of embodiments, the representative system included a stability sensor including a tilt switch, an actuatable or activatable device or system including a magnetorheological (MR) damper, and circuitry for the power supply.

Static stability and dynamic stability tests were conducted to see if the activatable system activated before the wheelchair tipped and to determine if the wheelchair would achieve a similar stability rating for the same test as the wheelchair received with the activatable MR Damper(s) fully engaged or stiffened. A low-cost linear brake device or system was also developed as an activatable system for use as an alternative to or to work in cooperation with a damper such as the MR Damper. In a number of embodiments hereof, activatable systems such as MR Dampers and/or brake devices can be retrofitted to existing personal mobility devices and other mobile devices or systems.

Although the application of such a representative system hereof is ostensibly to stiffen suspension on a power wheelchair equipped with a "soft" or resilient suspension (for example, including one or more springs or other resilient devices or systems), the applications are much broader. Applications of the sensor/activatable systems hereof include both manual- and electric-powered wheelchairs, mobile robotic bases, and devices without suspension. In general, stability of mobile devices is increase via a system including of at least one sensor to sense at least one variable related to or predictive of instability (tilting or tipping) and at least one actuator activatable system in operative connection with the sensor that can be actuated or activated to reduce the likelihood of or existence of instability. In other words, under conditions where instability exists or is predicted, then the actuator or activatable system would activate in such a way as to increase stability of the system.

A description of a representative embodiments of the activatable stability device or system for an electric powered wheelchair follows. One goal of the system was to develop and perform initial testing of a powered mobility active anti-tip system. As described above, a hybrid power operated vehicle (HyPOV) was used as a test-bed for this system. The HyPOV wheelchair 10 is a low-cost electrically powered wheelchair which was originally developed for use, for example, where cost may be a determinative factor. Many powered and manual wheelchairs may become unstable, for example, under certain high-speed turning situations.

The current design of wheelchair 10 uses a centrally located drive or hub drive wheel 42 to maneuver. The hub motor (not shown) may be fully enclosed within the hub of drive wheel 42. This allows for wheelchair 10 to function with only one motor as opposed to other power chairs which usually require two motor.

Wheelchair 10, which is similar to wheelchairs described in U.S. Pat. No. 7,882,909, includes a seat 12 mounted on a generally rectangular frame system 14 (see FIG. 2B). Frame system 14 may, for example, be made from metal or another similar rigid material. Frame 14 includes at least one rear rail 20 and side rails 22 on each side thereof. In the illustrated embodiment, side rails 22 are provided on each side, and connect between rear rail 20 and front wheel axle brackets. As described in U.S. Pat. No. 7,882,909, a solid axle joins two large freely spinning wheels 28 via wheel axle brackets. The brackets and axle solidly connect the side frame rails 22 to each other. Wheelchair 10 further includes a foot platform 70 connected to an extending member 66 via a pivotable connection 68.

Seat 12 is attached to side rails 22 of frame 14 via multiple sliding seat perches 24; at least one seat perch 24 (see FIG. 2A) on each side rail 22. Seat 12 can be mounted to face in either direction to be adaptable for various wheelchair user needs. Terms such as "front", "rear", "forward", "rearward", "upper", "lower" and like terms as used herein refer to the orientation of wheelchair 10 in FIGS. 2A through 2B.

As also described in U.S. Pat. No. 7,882,909, a pivot connection piece (not shown) is attached near the midpoint of the front solid axle and pivots about the axle between the large wheels 28. An elongated center swing arm 34 is rigidly attached to the pivot connection piece at one end, and to a midpoint of front rail 20 on the other end. This swing-arm system houses the motor/brake/turning system, generally 40. The pivot connection piece enables center swing arm 34 to pivot about the front solid axle and to move parallel to the longitudinal axis of side frame rails 22 according to the load balance on caster wheels 58 and a drive wheel 42 described below.

Drive wheel 42, which may, for example, be a hub-motor as described above, is placed in a fork 44 with a bearing (not shown) mounted near its topmost portion. Extending upwardly from the top of the bearing is a shaft 46. Shaft 46 extends optionally through center swing arm 34 and operatively connects to a steering mechanism 80 (including, for example, a tiller 82). Drive wheel 42, fork 44, bearing and shaft may connect to center swing arm 34 so that they can be adjusted along the length thereof. This adjustment of the position of drive wheel 42 permits the force on drive wheel 42 to be increased or decreased as the force on casters wheels 58 increases or decreases.

In the illustrated embodiment, a suspension link systems 50 includes upper link member 51U and lower link member 51L, which are connected between frame 14 and rotatable joints 54 for caster wheels 58. In the illustrated embodiment, a caster wheel connector 56 is attached to and extends downwardly from each rotatable joint 54. Caster wheels 58 are smaller than the two large wheels 28 and are capable of rotating 360 degrees by means of the rotatable joint 54. Caster wheels 58 are located on one end of wheelchair 10 opposite large wheels 28. Large wheels 28 can be located in the front of the wheelchair 10 and caster wheels 58 can be located in the rear (as illustrated) or vice versa, depending on the user's preference.

In the illustrated embodiment, each caster wheel connector 56 is connected to center swing arm 34 with separate upper link members 51U and lower link members 51L of suspension link systems 50. As also described in U.S. Pat. No. 7,882,909, upper link members 51U connect and pivot about an axle located inside rear frame rail 20. Lower link members 51L are fixed to, for example, a polymeric or metallic torsion spring 60 not shown which links to center swing-arm 34 through an adjustable bracket system 61. Other suspension system including other types of resilient members (for example, coil springs or leaf springs) can also be used. Such resilient members or elements allow vertical displacement of each caster wheel 58 independently and transfer force to the drive wheel 42 as caster wheels 58 encounter obstacles, bumps, uphill or downhill surfaces or any other kind of terrain.

Figure 2A:
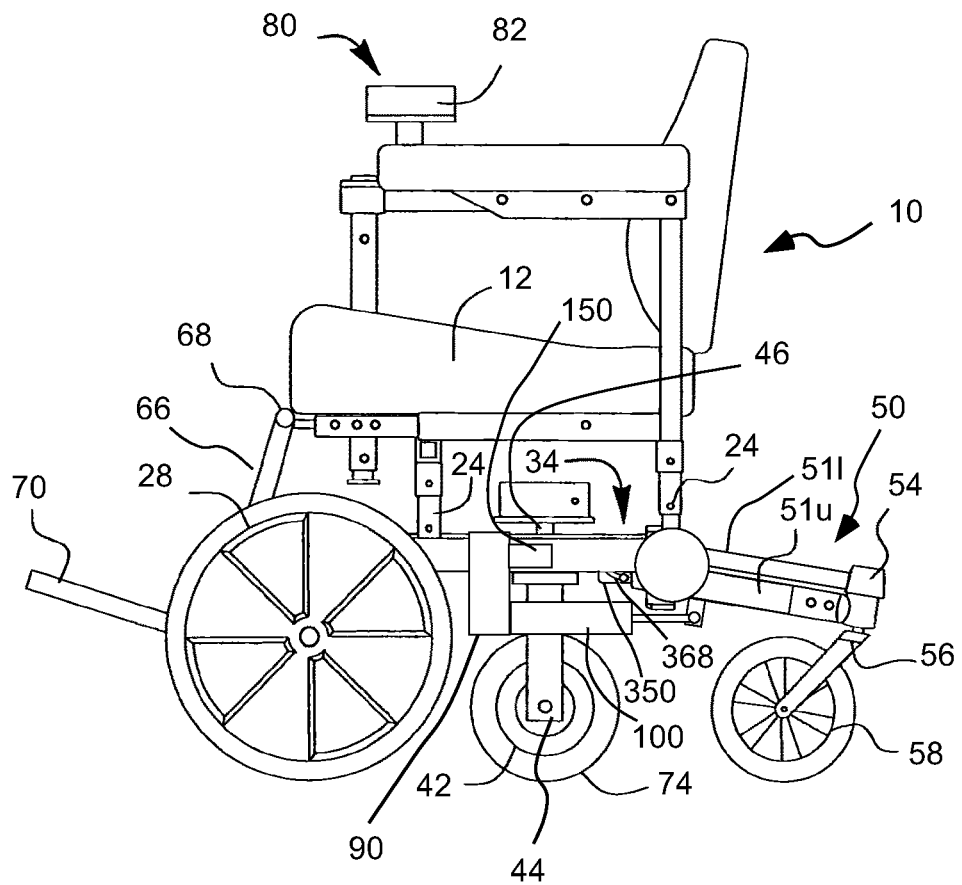
FIG. 2A illustrates a side view of a prototype wheelchair used in studies hereof.
Figure 2B:
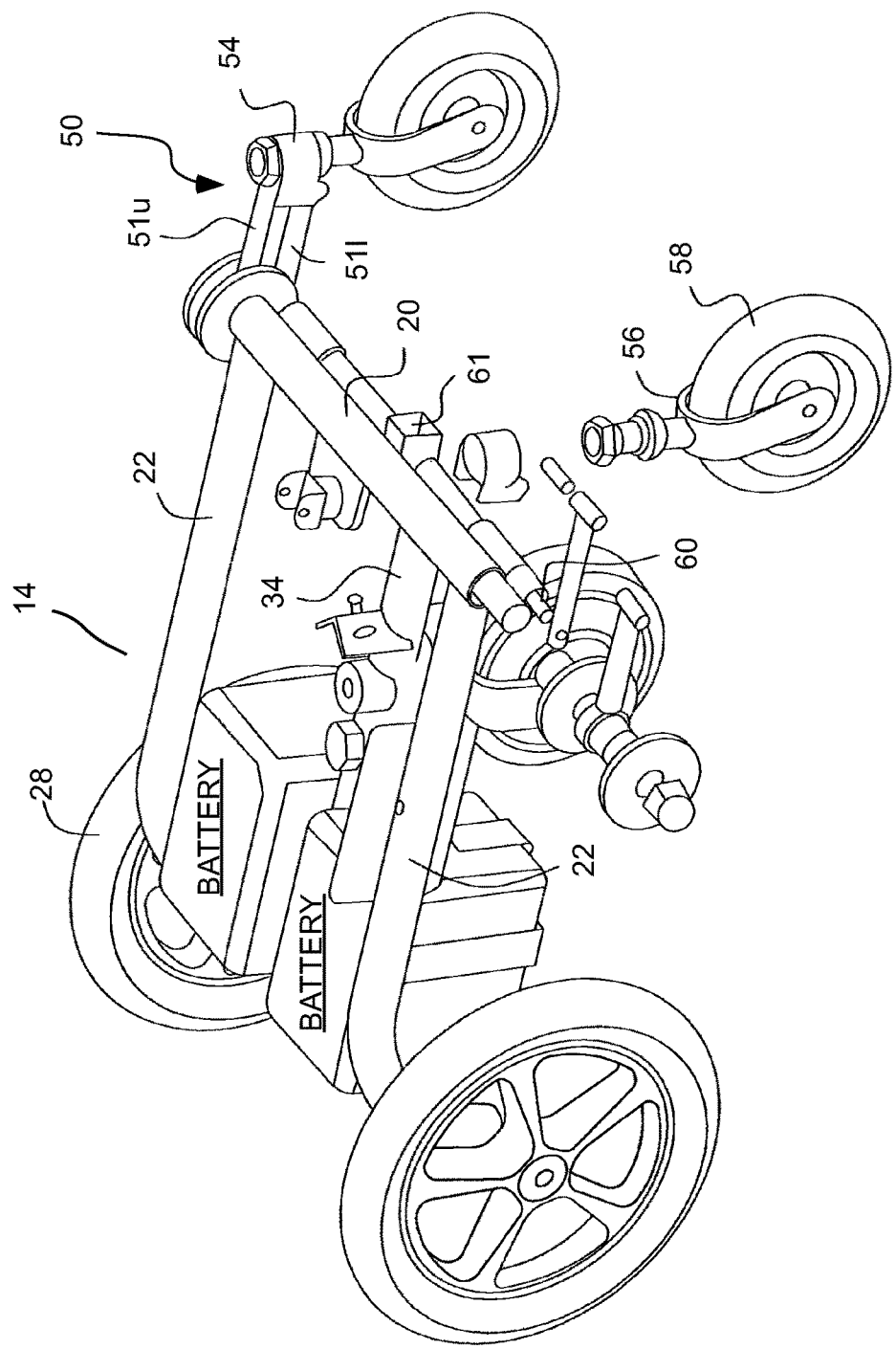
FIG. 2B illustrates an enlarged or close-up view of a portion of the wheelchair frame and suspension of the wheelchair of FIG. 1A.

Wheelchair 10 also includes activatable systems 100 on each side thereof (only one of which is shown in FIGS. 2A and 2B, with the other being substantially identical). Activatable systems 100 are connected at one end to lower link member 51U in the suspension system and to side rail 22 (via connecting bracket 90—see FIG. 2A) at another end thereof. In embodiments hereof, activatable systems 100 hereof may, for example, decrease the travel distance of a suspension or a portion thereof, stiffen dampers or shock absorbers to require more force for the suspension to travel, lock motion of the suspension or a portion thereof etc. In a number of embodiments, activatable systems 100 included MR (Magnetorheological) dampers. An MR damper uses a fluid that has a variable yield strength controlled by a magnetic field. When a higher voltage is passed into the controller via, for example, a control system 150 which is in operative connection with a sensor 300 as described below, the fluid stiffens which causes an increase to the damping force. However, the damper does not completely stop the linear motion. It can slow it down, but if there is enough force on the damper, it will eventually become completely stretched out or compressed. Upon activation one of activatable systems 100 including an MR damper, vertical travel of the associated caster wheel 58 is limited by the increased force required to overcome the resistance provided by the MR damper.

Figure 2C:
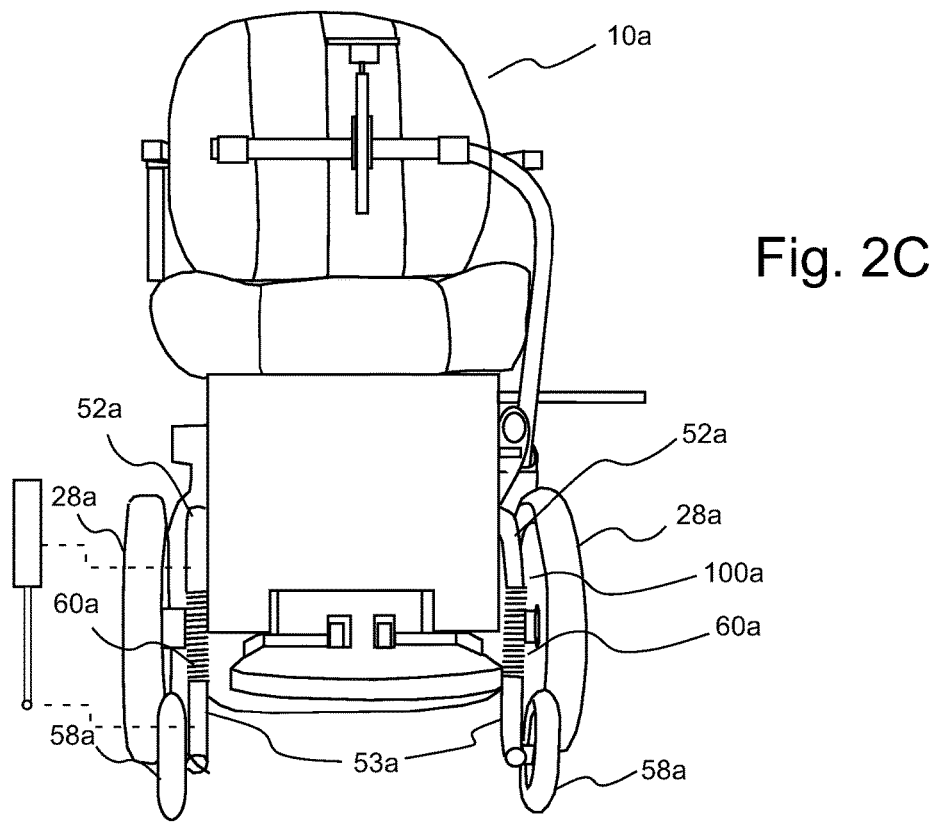
FIG. 2C illustrates a front view of another embodiment of a wheelchair and an activatable system hereof for use in connection with the wheelchair.
Figure 2D:
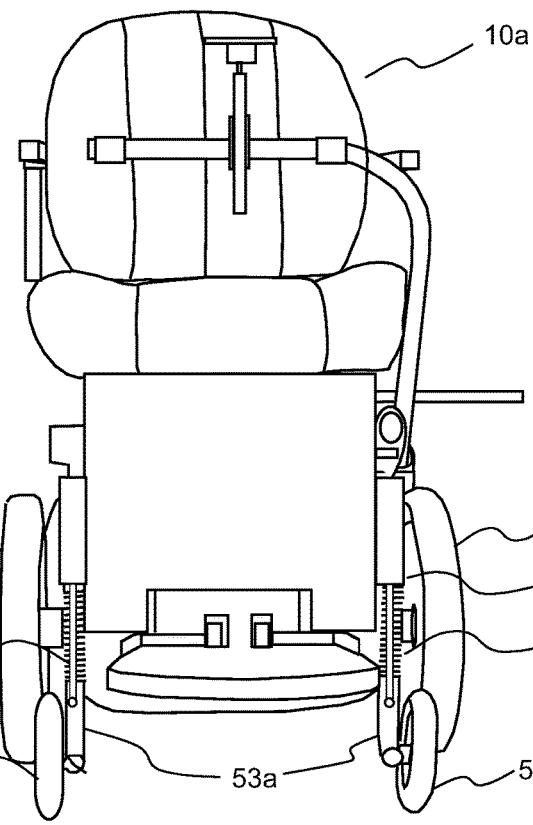
FIG. 2D illustrates another front view of the wheelchair of FIG. 2C with the activatable system hereof in operative connection with each castor wheel thereof.

FIGS. 2C and 2D illustrates the use of an activatable system 100a hereof in connection with another embodiment of wheelchair 10a. Similar to wheelchair 10, wheelchair 10a includes Caster wheels 58a located on one end of wheelchair 10a, opposite large wheels 28a. In the illustrated embodiment, however, large wheels 28a are located in the rear of wheelchair 10a and caster wheels 58 are located in the front thereof. Caster wheels 58a are connected to the frame of wheelchair 10a via a suspension system including springs 60a. Springs 60a are connected between castor wheel connecting members 53a and upper members 54a, which are operatively connected to wheelchair frame (not shown in FIGS. 2C and 2D). Activatable systems 100a are connected at one end to upper members 54a and at another end to castor wheel connecting members 53a. Upon actuation or activation of activatable system(s) 100a, vertical travel of the associated caster wheel 58a relative to the associated upper member 54a (and the frame) is limited or prevented. In a number of embodiments hereof, activatable systems hereof are connected between a suspended portion of a wheelchair or other mobile device (for example, a frame) and a non-suspended portion thereof (for example, a wheel) to limit or prevent relative motion between the suspended portion and the non-suspended portion.

A number of activatable systems other than MR. dampers are suitable for use herein. For example, an activatable system including a linear brake was designed as an alternative (or an addition) to MR dampers. As described above, MR dampers do not completely prevent the suspension from moving. MR damper only cause it to require more force to move the suspension at some speed. Moreover, MR dampers are relatively costly (for example, approximately $400). A lower-cost device for use in the activatable systems hereof may be desirable in certain circumstance (for example, in a case in which a wheelchair or other mobile device is being retrofitted with activatable systems hereof). A device or system such as a linear brake, which actually locks the suspension (preventing movement thereof) may be used and may be more effective at preventing the mobile device from tipping. An activatable brake system may, for example, be designed so that the dimensions are roughly the same as the MR dampers used in activatable systems 100 (with substantially less cost). In other embodiments, a linear or rotary brake, such as those that use electromagnets for actuation, may be used to stiffen either suspension systems or other anti-tip systems hereof to stabilize a mobile device such personal mobility device.

Figure 3A:
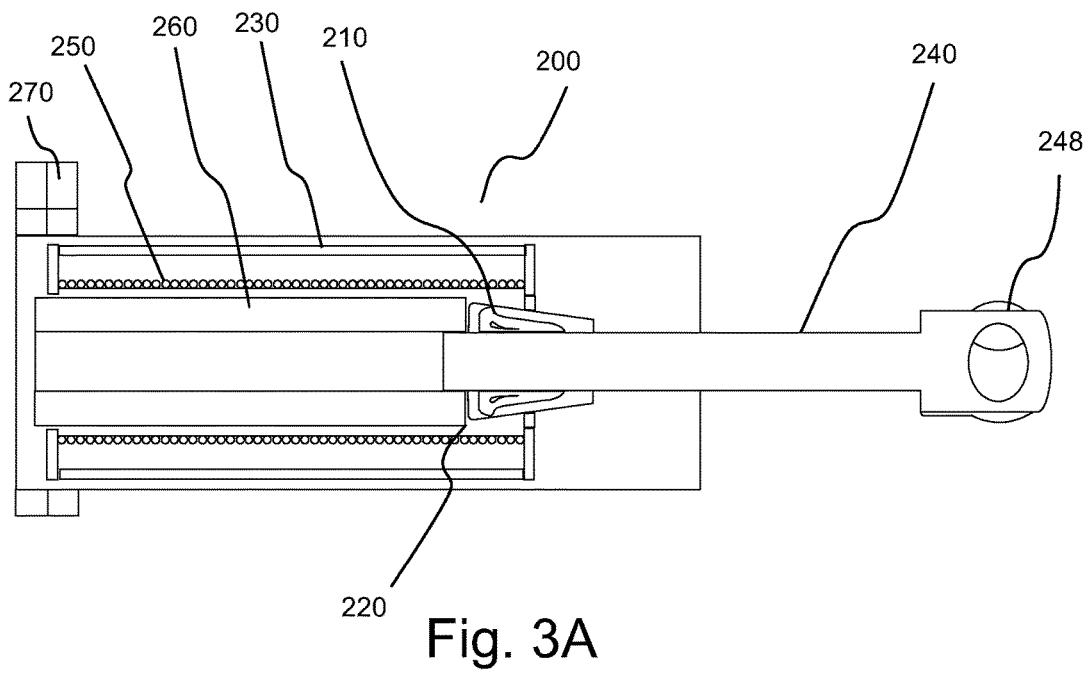
FIG. 3A illustrates a cross-sectional view of an embodiment of a linear brake system hereof.
Figure 3B:
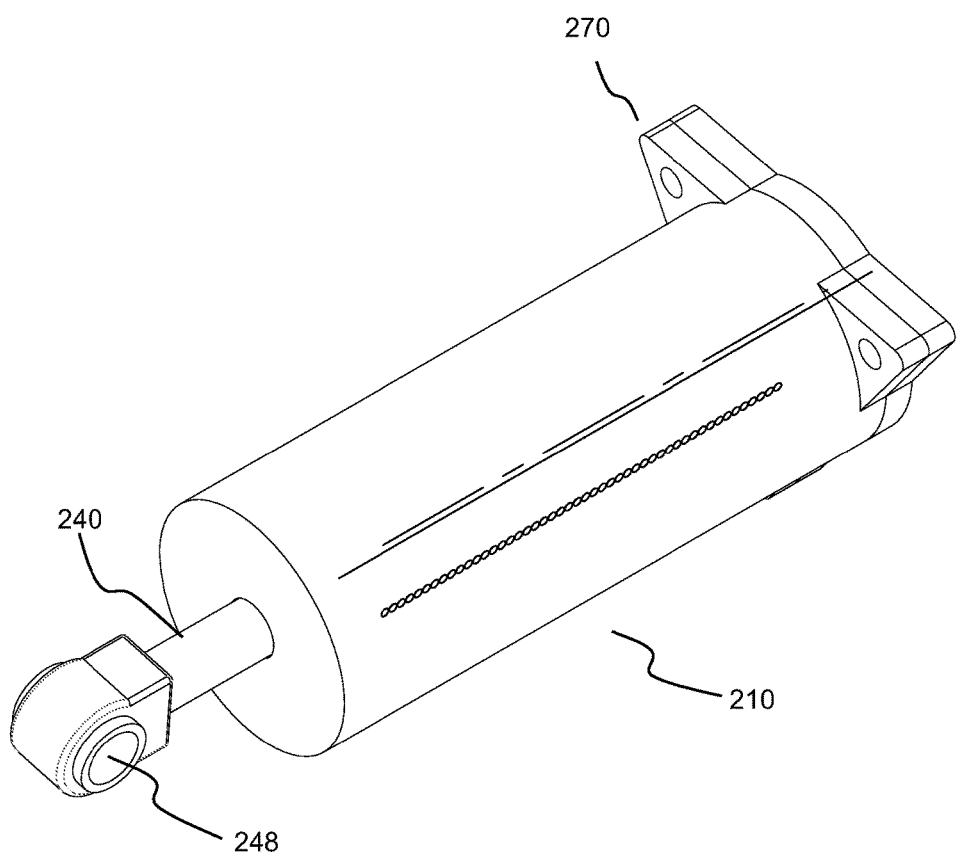
FIG. 3B illustrates a perspective view of the linear brake system of FIG. 3A.

An embodiment of a linear brake system 200 for use in the systems hereof is shown in FIGS. 3A and 3B. In linear brake system 200, a wedge 210 is be forced into a cone 220 within a housing 230 and which then causes wedge 210 to apply a normal force to a rod 240. Wedge 210 is forced into cone 220 via the electromagnetic force of a coil 250, which (upon activation) forces a plunger 260 into wedge 210. Linear brake system 200 operates in a manner similar to a solenoid. Operation of the system can be altered and/or optimized via control of, for example, angles for wedge 210 and cone 220, the force needed and obtainable by coil 250, and the maximum size allowable for the linear brake system 200. Linear brake system 200 includes a connector 248 upon a distal end of rod 240, and a connector 270 on another end linear brake system 200 via which linear brake system 200 may be attached to, for example, be connected at one end to lower link member 51U in the suspension system and to side rail 22L at another end thereof as described above in connection with activatable system 100.

In a number of studies hereof, an OMRON® Model D7E-3 tilt switch 300, available from Omron Electronic Components of Schaumburg, Ill. was used to sense instability. Examples of sensors that may be used in the systems hereof include, but are not limited to, tilt switches or sensors, gyroscopes, accelerometers, camera, microphones, force sensors, etc. Multiple sensors of different types may, for example, be used in a single system. Control thresholds may, for example, be based upon accelerations/decelerations that are in a direction not aligned with travel, or measures of roll, pitch or yaw from, for example, a gyroscope. Alternatively, one could measure the reaction force of each wheel and determine when/if one was going to lose contact, or has lost contact, with the ground.

Figure 4:
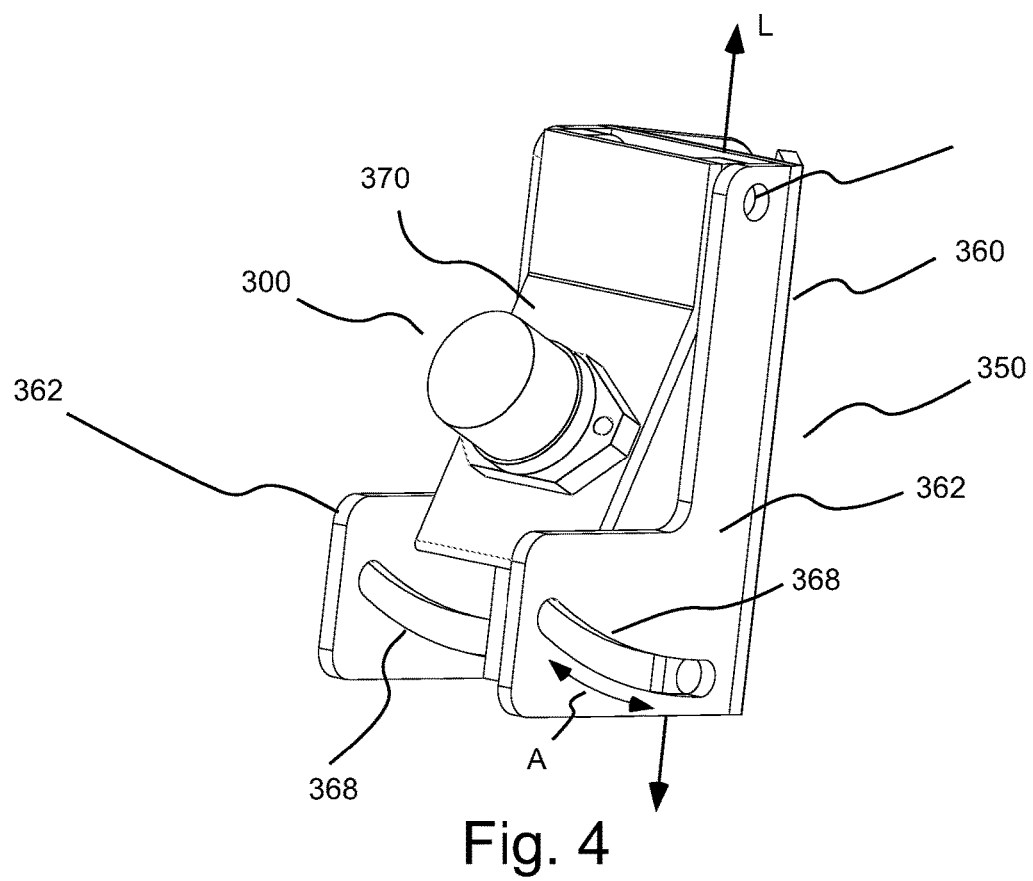
FIG. 4 illustrates a perspective view of an embodiment of a sensor support hereof via which a sensor can be attached to a mobile device at a desire initial or starting angle or orientation.

A platform or support 350 (see FIGS. 4A and 4B) upon which a sensor such as a tilt sensor 300 (that is, a sensor to detect orientation, inclination or tilting) may be supported was developed. Support 350 included a generally U-shaped bracket 360 to which support member 370 is connected. Sensor 300 was attached to support member 370, which may be angled with respect to a longitudinal orientation L of bracket 360 to adjust the starting orientation or angle of sensor 300 (when no tilting is occurring). The specification sheet for one embodiment of a studied tilt sensor 300 indicated that the sensor would switch at 40 degrees, but the best angle at which wheelchair 10 should be when the switch activates activatable system 100 was unknown at the beginning of the studies hereof and may vary between different types of mobile devices. Therefore, support 350 was made to be adjustable. In that regard, side members 362 of bracket 360 were formed with curves slots or extending passages 368 formed therein. The position of connectors such as bolts used in connection slots 368 may be varied as represented by arrow A in FIG. 4A to vary the starting angle of sensor 300. In a number of embodiments, tilt sensor 300 could be placed at a starting angle in the range between 15 to 45 degrees.

Figure 5A:
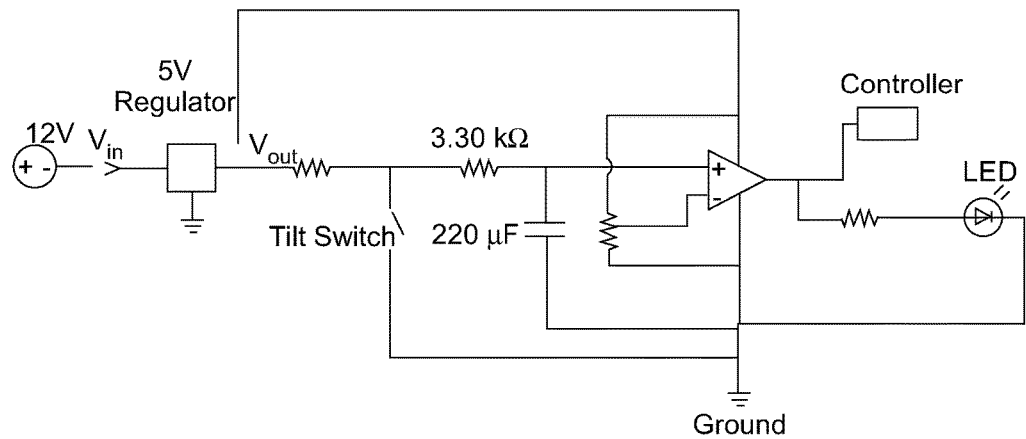
FIG. 5A illustrates an embodiment of a control system for use with the activatable systems and sensors hereof.

A circuit, illustrated schematically in FIG. 5, for representative tilt switch sensor 300 was developed to be used in connection with activatable systems 100 including MR dampers. The circuit includes a subsystem or control system (for example, including a filter) to selectively activate activatable system 100. Tilt switch sensor 300, by itself, might, for example, activate activatable system 100 every time wheelchair 10 hit a bump. Even worse, tilt switch sensor 300 might deactivate activatable system 100 if wheelchair 10 hit a bump while it was on an incline.

In the circuit of FIG. 5, a low-pass filter was used to selectively activate or actuate activatable system 100. The low-pass filter circuit may, for example, result in activatable system 100 being activated only if tilt switch sensor 300 is on/activated more than 50% of the time or if tilt switch sensor 300 is on/activated for longer than the rise time for the filter. In a number of embodiments, actuation or activation would not occur unless tilt switch sensor 300 is open for longer than approximately one second.

Figure 5B:
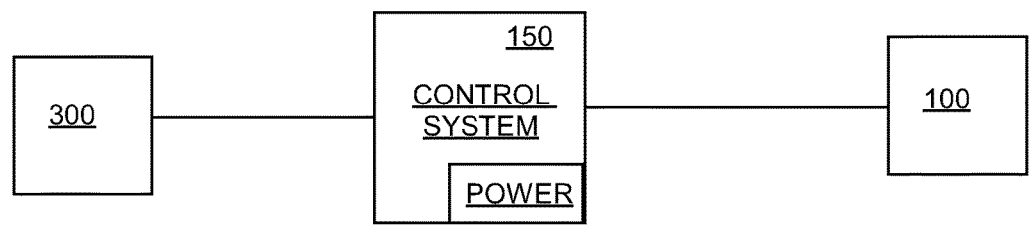
FIG. 5B illustrates a generalize schematic view of a system hereof including a sensor, a control system and an activatable system.

As illustrated schematically in FIG. 5B, a control system with appropriate logic is desirable to activate the activatable devices or systems hereof (to, for example, stiffen or lock a suspension system) in those situations or circumstances when desired or required. Circuitry may, for example, be replaced with mechanical systems. Moreover, a processor (for example, a micro-controller or micro-processor) may also or alternatively be used to integrate sensor signals and determine when an instability is occurring or is about to occur, and in-turn trigger activatable system 100.

ANSI (American National Standards Institute) and RESNA (Rehabilitation Engineering and Assistive Technology Society of North America) [1, 2] have specific tests that are to be conducted to determine how stable a personal mobility device is and to compare different personal mobility device to each other. To test the actively controlled suspension system of wheelchair 10, three trials were completed with each test: one with the softest possible suspension (MR Dampers off), one with the stiffest suspension (MR Dampers fully engaged), and one with the active anti-tip system enabled. The ANSI/RESNA tests that were selected to be done are shown Table 1 below.

TABLE 1

| ANSI/RESNA Section | | |
|---|---|---|
| | Direction | Description |
| Static Stability | | |
| 9.2 | Forward | Wheels unlocked and wheelchair in least stable configuration |
| 10.2 | Backward | Wheels unlocked and wheelchair in least stable configuration |
| 12.1 | Lateral | Wheelchair in the least stable configuration |
| Dynamic Stability | | |
| 10.2 | — | Turning on a slope |
| 10.3 | — | Turning in a circle at maximum speed |
| 10.4 | — | Turning suddenly at maximum speed |

The results of the static stability test are shown in Table 2 below. The results show that the performance of wheelchair 10 with the actively controlled suspension system is statistically the same as the performance with the dampers fully powered.

TABLE 1

| | Static Test Tip Angle | | |
|---|---|---|---|
| Suspension | Forward | Backward | Lateral |
| Dampers Off | 24.0 | 7.8 | 4.3 |
| Dampers on | 23.7 | 10.0 | 6.1 |
| Tilt Switch Active | 23.8 | 9.0 (2.0) | 5.8 (.9) |

The results of the dynamic stability tests show the same correlation except for the section 10.2 test. The result obtained in the 10.2 test is believed to be a result of the delay in the circuit being too long and wheelchair 10 starting to tip before tilt switch sensor 300 was activated. The time constant of the low pass filter may, for example, be decreased for wheelchair 10 to pass this test. Table 4 summarizes how the tests and results were obtained.

TABLE 3

| Dynamic Lateral | Test Scores | | |
|---|---|---|---|
| Suspension | 10.2 | 10.3 | 10.4 |
| Dampers Off | 0 | 2 | 2 |
| Dampers on | 2 | 2 | 3 |
| Tilt Switch Active | 0 | 2 | 3 |

TABLE 4

| Wheelchair test ratings | | |
|---|---|---|
| 0 | Full tip | The wheelchair tips completely over (90° or more from its original orientation) unless caught by a restraining device or testing personnel for test purposes |
| 1 | Stuck on anti-tip device | The wheelchair anti-tip device(s) contacts the test plane, and the wheelchair remains stuck on the anti-tip device(s) |
| 2 | Transient tip | Less than three wheels remain on the test plane at some point during the test and then drop back on the test plane, whether or not any anti-tip devices contact the test plane |
| 3 | No tip | At least three wheels remain on the test floor at all times |

The activatable stability devices, systems and/or methods hereof can improve the stability of mobile devices, including personal mobility devices (whether powered or manual), without substantially effecting the normal operations. In a number of embodiments, the activatable systems here prevent ratings of 0 or 1, or 0, 1 or 2 as set forth in Table 4. In that regard, in a number of embodiment, either full tilting/tipping or sticking/resting on a static anti-tip device of a mobile device or system (including personal mobility devices) is prevented or, any tipping or tilting that does occur is transient. In other embodiments, even transient tipping (wherein in wheel loses contact with the surface) is prevented.

Studies of anti-tip suspensions including activatable stability devices or systems on a single side of the chair are discussed above. Use of activatable anti-tip or stabilizing devices or systems hereof on each side of, for example, a wheelchair or other mobile device will provide improved performance. Dynamic stability tests may, for example, be used in connection with a particular type of mobile device to ensure that the one or more active stability systems activate only in desired circumstances and not in other circumstances (for example, during obstacle climbing). In the case of control systems including, for example, a low pass filter, the low pass filter (or other control system) characteristics or stationary angle of the tilt sensor base may, for example, be readily adjusted to achieve improved performance. A potentiometer may, for example, be used to adjust sensitivity of the filter. Once again, one or more processors (for example, micro-controllers or micro-processors) may also be used to integrate sensor signals, and classify whether instability is occurring or about to occur.

In a number of embodiments, the activatable stability device, systems and/or methods hereof may, for example, be activated to decrease travel distance of a suspension or a portion thereof, stiffen dampers or shock absorbers, lock motion of the suspension or a portion thereof etc. as described above. The activatable systems hereof need not be formed integrally with the suspension system of a mobile device. Indeed, the activatable system hereof are readily retrofitted onto mobile system such as personal mobility devices. In a number of embodiments, such mobile systems include a suspension system comprising one or more resilient members such as springs.

Figure 6A:
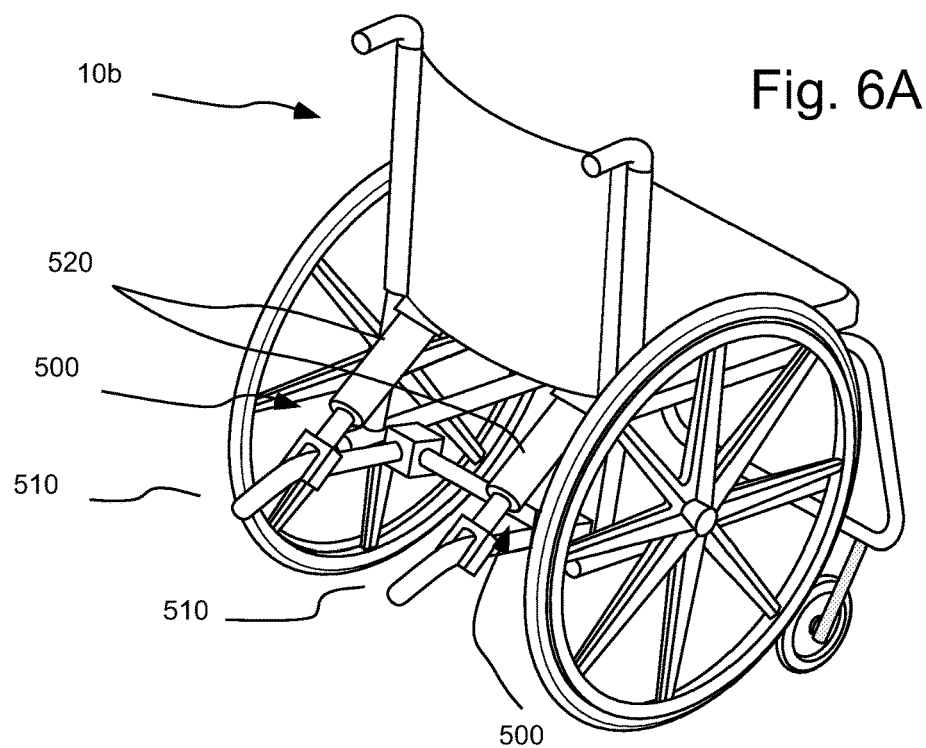
FIG. 6A illustrates a rear perspective view of a manual wheelchair including embodiments of activatable systems hereof to increase stability (reduce the likelihood of tipping or excessive tilting) wherein the activatable systems are in a non-activated state.
Figure 6B:
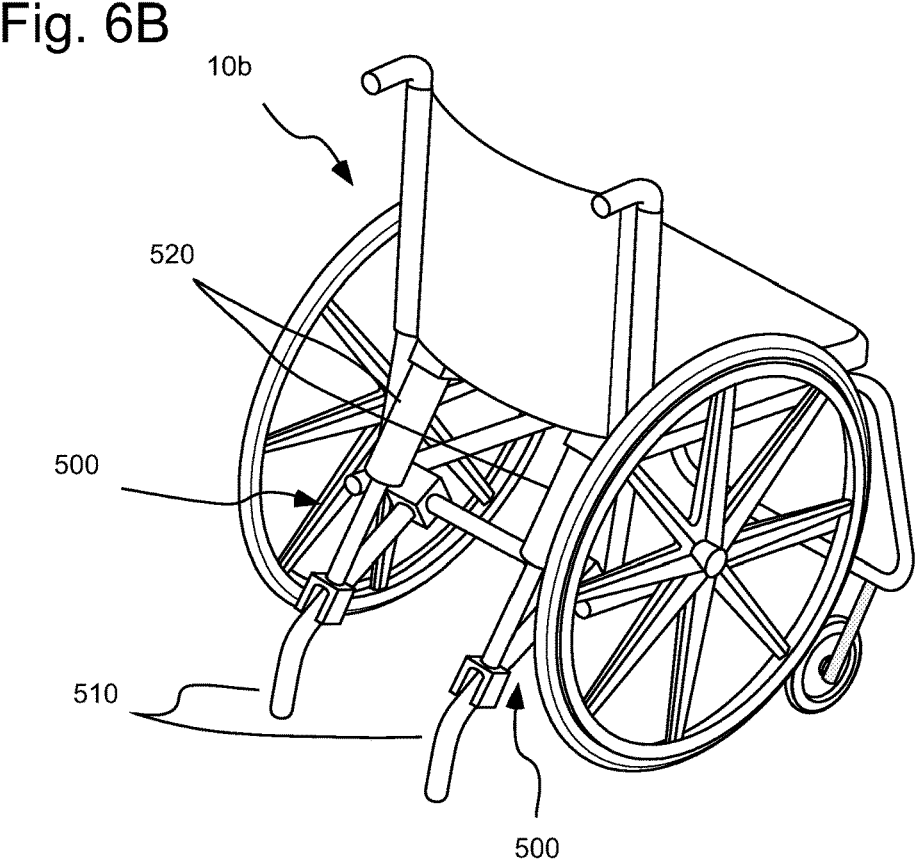
FIG. 6B illustrates another rear perspective view of the manual wheelchair of FIG. 6A wherein the activatable systems are in an activated state.

Although representative embodiments of the use of activatable stability devices and/or systems hereof in connection with a suspension system of a mobile device or system are discussed above, the activatable stability devices, systems or methods hereof may be used in connection with manual personal mobility devices (for example, manually operated wheelchairs) and need not be used in connection with a suspension system. FIGS. 6A and 6B illustrate a representative embodiment of activatable stability systems 500 hereof which includes two activatable devices attached to the rear of a manual wheelchair 10b. Each of activatable systems 500 is in operative connection with an abutment member 510 or anti-tip device which is rotatably or pivotably attached to wheelchair 10b. In the non-activated state as illustrated in FIG. 6A, activatable systems 500 maintain abutment member 510 in a first, non-activated or non-actuated state in which abutment member 510 are maintained at a suitable height to prevent interference with normal operation of wheelchair 10b. In FIG. 6B, the activatable system have been activated or actuated (via, for example, a sensor system and control system as described above) to rotate or pivot abutment members 510 to a lower position to increase stability and reduce the likelihood of or prevent tipping. In the illustrated embodiment, abutment members 510 are lowered and raised via actuatable or activatable cylinders 520 which may, for example, be solenoids or hydraulic cylinders. Additional or alternative activatable devices and cooperating abutment members may, for example, be placed at other positions on the wheelchair (for example, on the front and/or sides thereof).

Figure 6C:
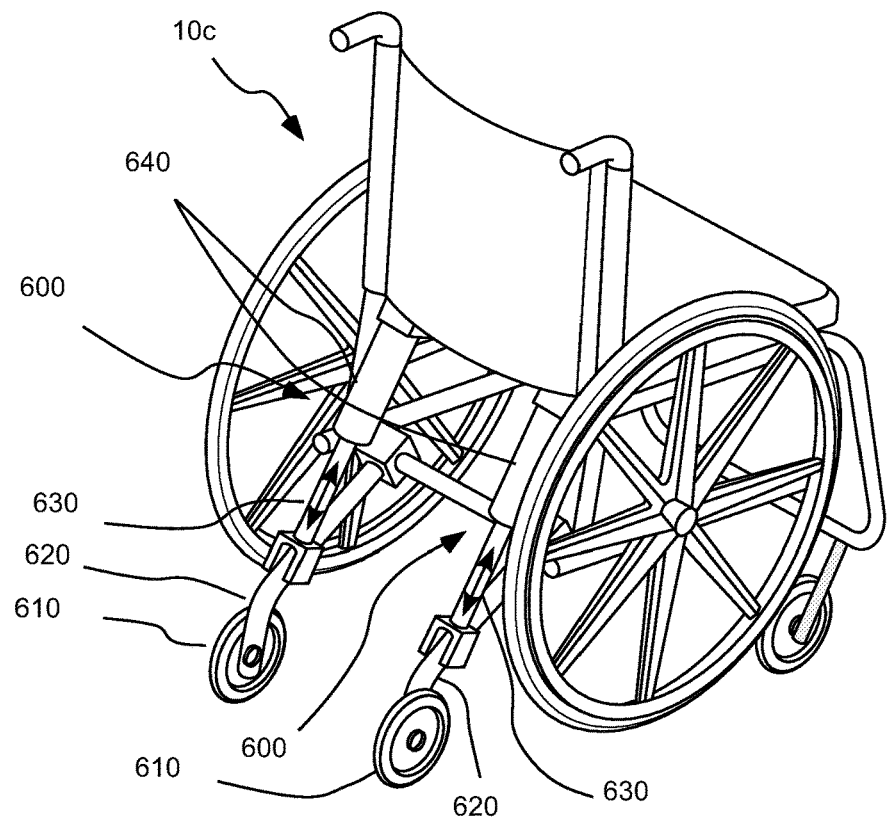
FIG. 6C illustrates a rear perspective view of a manual wheelchair including embodiments of activatable systems hereof to increase stability wherein the activatable systems are in a non-activated state.
Figure 6D:
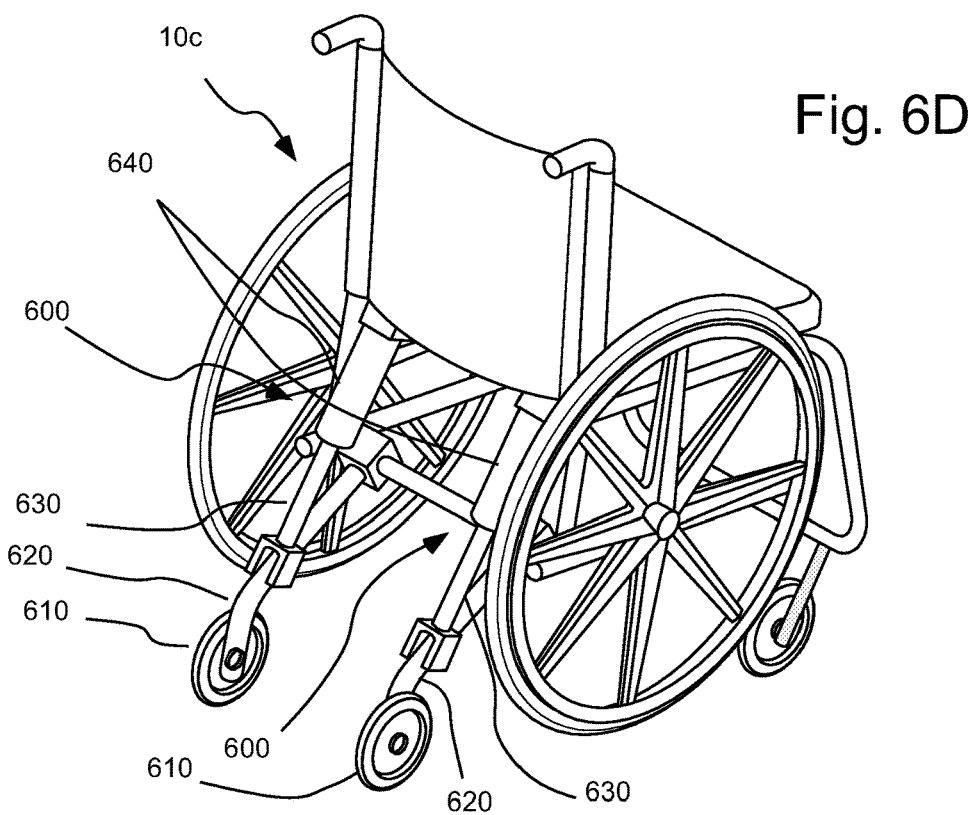
FIG. 6D illustrates another rear perspective view of the manual wheelchair of FIG. 6C wherein the activatable systems are in an activated state.

FIGS. 6C and 6D illustrate another representative embodiment of activatable stability systems 600 hereof which includes two activatable devices attached to the rear of a manual wheelchair 10c. Each of activatable systems 600 is in operative connection with an wheel 610 which is rotatably attached to an extending or outrigger member 620. In the non-activated state as illustrated in FIG. 6C, wheels 610 are free to move up and down relative to a surface upon which wheelchair 10c is travelling via extending members or rods 630 which move telescopically through cylinders 640. Rods 630 may, for example, be biased to assist in maintaining wheels 610 in contact with the surface. Upon actuation of activatable system 600, rod 630 is locked in position or requires increased force to move relative to cylinder 640, thereby maintaining wheels 610 in contact with the surface and prevent or limit movement thereof up or down relative to the surface. Activatable systems 600 may be activated or actuated via, for example, a sensor system and control system as described above to increase stability and reduce the likelihood of or prevent tipping. Additional or alternative activatable devices and cooperating abutment members may, for example, be placed at other positions on wheelchair 10c (for example, on the front and/or sides thereof). In general, manual wheelchairs such as wheelchair 10c are unlikely to tip in a lateral direction, but one or more activatable systems similar in operation to activatable systems 600 may, for example, be placed on one or both sides of a powered wheelchair to prevent lateral tipping. Activatable system 600 may, for example be operated to limit tipping and/or to prevent even transient tipping as discussed above.

The foregoing description and accompanying drawings set forth a number of representative embodiments at the present time. Various modifications, additions and alternative designs will, of course, become apparent to those skilled in the art in light of the foregoing teachings without departing from the scope hereof, which is indicated by the following claims rather than by the foregoing description. All changes and variations that fall within the meaning and range of equivalency of the claims are to be embraced within their scope.

What is claimed is:

1. A system for use with a mobile device for travelling upon a surface comprising: a plurality of wheels for operatively engaging a surface, at least one sensor to sense a variable having a threshold value indicative of a loss of contact between at least one of the plurality of wheels and the surface or an imminent loss of contact between at least one of the plurality of wheels and the surface during operative use of the mobile device, a control system in operative connection with the at least one sensor, and at least one abutment member in operative connection with the control system, wherein the at least one abutment member is configured to have a first position at which the at least one abutment member does not contact the surface until the threshold value is sensed by the sensor, and wherein the control system is configured to activate an actuator in operative connection with the at least one abutment member upon sensing of the threshold value to move the at least one abutment member to a second position at which the at least one abutment member is configured to contact the surface upon tipping of the mobile device.

2. The system of claim 1 further comprising a plurality of abutment members in operative connection with the control system, wherein each of the plurality of abutment members is in a first position at which the abutment member does not contact the surface, and wherein the control system is configured to activate one or more actuators in operative connection with one or more of the plurality of abutment members to move the one or more of the plurality of abutment members to a second position at which the one or more of the plurality of abutment members is configured to contact the surface upon tipping of the device.

3. The system of claim 1 wherein the at least one abutment member is positioned on a rear of the mobile device, on a side of the mobile device or on a front of the mobile device.

4. The system of claim 1 wherein the mobile device is a personal mobility device.

5. The system of claim 4 wherein the personal mobility device is an electrically powered wheelchair or an electrically powered scooter.

6. The system of claim 1 wherein the mobile device is a manually powered wheelchair.

7. The system of claim 1 wherein the at least one abutment member operates independently of a suspension system of the mobile device.

8. The system of claim 7 wherein the system is configured to be added to a previously manufactured mobile device.

9. The system of claim 1 wherein the at least one abutment member comprises a wheel on an end thereof.

10. The system of claim 9 wherein the wheel of the at least one abutment member remains in contact with the surface when activated to the second position and is retracted to the first position so that is does not contact the surface under normal use of the mobile device when not activated.

11. A method of operating a mobile device including a plurality of wheels for operatively engaging a surface comprising: providing at least one sensor to sense a variable having a threshold value indicative of a loss of contact between at least one of the plurality of wheels and the surface or an imminent loss of contact between at least one of the plurality of wheels and the surface during operative use thereof in operative connection with the mobile device, providing a control system in operative connection with the at least one sensor, providing at least one abutment member in operative connection with the control system, maintaining the at least one abutment member in a first, retracted position in which the at least one abutment member does not contact a surface of the environment in which the mobile device is used until the threshold value is sensed, and actuating an actuator via the control system to extend the at least one abutment member to a second, extended position via the control system upon sensing of the threshold value, the at least one abutment member being configured to contact the surface of the environment in which the mobile device is used upon tipping of the mobile device in the second, extended position.

12. The method of claim 11 further comprising providing a plurality of abutment members in operative connection with the control system, maintaining each of the plurality of abutment members in a first, retracted position in which the at least one abutment member does not contact a surface of the environment in which the mobile device is used until the threshold value is sensed, and actuating via the control system one or more actuators in operative connection with one or more of the plurality of abutment member to move the one or more of the plurality of abutment members to a second, extended position at which the one or more of the plurality of abutment members is configured to contact the surface upon tipping of the device.

13. The method of claim 11 wherein the at least one abutment member is positioned on a rear of the mobile device, on a front of the mobile device or on a side of the mobile device.

14. The method of claim 11 wherein the mobile device is a personal mobility device.

15. The method of claim 14 wherein the personal mobility device is an electrically powered wheelchair or an electrically powered scooter.

16. The method of claim 11 wherein the mobile device is a manually powered wheelchair.

17. The method of claim 11 wherein the at least one abutment member operates independently of a suspension system of the mobile device.

18. The method of claim 17 wherein the at least one sensor, the at least one abutment member and the control system are configured to be added to a previously manufactured mobile device.

19. The method of claim 11 wherein the at least one abutment member comprises a wheel which remains in contact with the surface when activated to the second, extended position and does not contact the surface in the first, retracted position.

20. A mobile system, comprising: an anti-tip system comprising at least one sensor to sense a variable having a threshold value indicative of a loss of contact between at least one of a plurality wheels of a mobile device and a surface engaged by the plurality of wheels during operative use of the mobile device or an imminent loss of contact between at least one of the plurality of wheels and the surface and at least one abutment member in operative connection with the control system, wherein the at least one abutment member is configured to have a first position at which at least one abutment member does not contact a surface of an environment in which the mobile device is used until the threshold value is sensed by the sensor, and wherein the control system is configured to activate an actuator to move the at least one abutment member upon sensing of the threshold value to a second position at which the at least one abutment member is configured to contact the surface upon tipping of the mobile device.

\* \* \* \* \*